(12) United States Patent  
Ganz et al.

(10) Patent No.: US 7,460,514 B2
(45) Date of Patent: *Dec. 2, 2008

(54) ADAPTIVE MEDIA CONTROL

(75) Inventors: Aura Ganz, Amherst, MA (US); Zvi Ganz, Amherst, MA (US); Ilwham Kim, Amherst, MA (US)

(73) Assignee: University of Massachusetts, Boston, MA (US)

( * ) Notice: Subject to any disclaimer, the term of this patent is extended or adjusted under 35 U.S.C. 154(b) by 141 days.

This patent is subject to a terminal disclaimer.

(21) Appl. No.: 11/492,735

(22) Filed: Jul. 25, 2006

(65) Prior Publication Data

US 2006/0262769 A1    Nov. 23, 2006

Related U.S. Application Data

(63) Continuation of application No. 09/502,143, filed on Feb. 11, 2000, now abandoned, which is a continuation-in-part of application No. 08/907,812, filed on Aug. 14, 1997, now Pat. No. 6,049,549.

(30) Foreign Application Priority Data

Aug. 13, 1998    (WO) .................... PCT/US98/16836

(51) Int. Cl.
*H04J 3/16*    (2006.01)
*H04L 12/403*    (2006.01)
(52) U.S. Cl. .................. 370/346; 370/449; 370/465
(58) Field of Classification Search .................. 370/346, 370/449, 465
See application file for complete search history.

(56) References Cited

U.S. PATENT DOCUMENTS 3,864,521 A    2/1975    Delong et al.
4,829,297 A    5/1989    Ilg et al.
4,996,518 A    2/1991    Takahashi et al.

(Continued)

FOREIGN PATENT DOCUMENTS

EP    0767 548    4/1997

(Continued)

OTHER PUBLICATIONS

Assad, "Multicommodity Networks Flows—A Survey", Networks, 8:37-31, 1978.

(Continued)

*Primary Examiner*—Alpus H Hsu
(74) *Attorney, Agent, or Firm*—Fish & Richardson P.C.

(57) ABSTRACT

A media control approach that supports transmission of data streams with QoS requirements, such as minimum throughput or maximum delay, while adapting to the changing characteristics of the transmission medium. The media control approach includes use of a polling manager and a resource manager. The resource manager provides an admission control procedure that prevents admission of sessions that cannot be supported by the system and allocates network resources needed to support admitted sessions. The polling manager uses an efficient "just in time" polling of stations based on their allocated bandwidth or communication rates. Stations that do not use their allocated rates are polled less often than those which use their allocation, thereby increasing the total throughput of the system and providing proper quality of service support for real-time applications.

31 Claims, 6 Drawing Sheets

U.S. PATENT DOCUMENTS

| | | | |
|---|---|---|---|
| 5,130,983 | A | 7/1992 | Heffner, III |
| 5,132,680 | A | 7/1992 | Tezuka et al. |
| 5,164,942 | A | 11/1992 | Kammerman et al. |
| 5,185,737 | A | 2/1993 | Nassehi et al. |
| 5,220,564 | A | 6/1993 | Tuch et al. |
| 5,231,634 | A | 7/1993 | Giles et al. |
| 5,241,542 | A | 8/1993 | Natarajan et al. |
| 5,276,680 | A | 1/1994 | Messenger |
| 5,276,703 | A | 1/1994 | Budin et al. |
| 5,282,222 | A | 1/1994 | Fattouche et al. |
| 5,291,475 | A | 3/1994 | Bruckert |
| 5,297,144 | A | 3/1994 | Gilbert et al. |
| 5,319,711 | A | 6/1994 | Servi |
| 5,339,316 | A | 8/1994 | Diepstraten |
| 5,349,342 | A | 9/1994 | Nilles et al. |
| 5,355,520 | A | 10/1994 | Freeburg et al. |
| 5,369,639 | A | 11/1994 | Kamerman et al. |
| 5,371,734 | A | 12/1994 | Fischer |
| 5,371,738 | A | 12/1994 | Moelard et al. |
| 5,371,780 | A | 12/1994 | Amitay |
| 5,371,794 | A | 12/1994 | Diffie et al. |
| 5,373,503 | A | 12/1994 | Chen |
| 5,379,290 | A | 1/1995 | Kleijne |
| 5,384,777 | A | 1/1995 | Ahmadi et al. |
| 5,406,261 | A | 4/1995 | Glenn |
| 5,408,465 | A | 4/1995 | Gusella et al. |
| 5,410,738 | A | 4/1995 | Diepstraten et al. |
| 5,416,777 | A | 5/1995 | Kirkham |
| 5,422,885 | A | 6/1995 | Nadkarni |
| 5,422,887 | A | 6/1995 | Diepstraten et al. |
| 5,434,852 | A | 7/1995 | La Porta et al. |
| 5,436,905 | A | 7/1995 | Li et al. |
| 5,457,689 | A | 10/1995 | Marvit et al. |
| 5,479,404 | A | 12/1995 | Francois et al. |
| 5,563,883 | A | 10/1996 | Cheng |
| 5,611,730 | A | 3/1997 | Weiss |
| 5,638,371 | A | 6/1997 | Raychaudhuri et al. |
| 5,644,715 | A | 7/1997 | Baugher |
| 5,655,219 | A | 8/1997 | Jusa et al. |
| 5,659,787 | A | 8/1997 | Schieltz |
| 5,768,280 | A | 6/1998 | Way |
| 5,793,747 | A | 8/1998 | Kline |
| 5,796,732 | A * | 8/1998 | Mazzola et al. ............. 370/362 |
| 5,825,772 | A * | 10/1998 | Dobbins et al. ............. 370/396 |
| 5,886,993 | A | 3/1999 | Ruszczk et al. |
| 5,917,822 | A | 6/1999 | Lyles et al. |
| 5,926,476 | A | 7/1999 | Ghaibeh |
| 5,973,609 | A | 10/1999 | Schoch |
| 6,006,017 | A | 12/1999 | Joshi et al. |
| 6,049,549 | A | 4/2000 | Ganz et al. |
| 6,114,968 | A * | 9/2000 | Ramakrishnan et al. .... 340/3.51 |
| 6,198,728 | B1 * | 3/2001 | Hulyalkar et al. ........ 370/310.1 |

FOREIGN PATENT DOCUMENTS

| | | |
|---|---|---|
| WO | WO 96/37835 | 11/1996 |

OTHER PUBLICATIONS

Barnhart et al., "Integer Mulitcommodity Flow Problems," manuscript, Auburn University, 1995.

Bertsekas et al., Data Networks, chapter 6, sections 6.4.2, 6.4.3, 6.5, and 6.6, pp. 448-455, 1987.

Dror et al., "Vehicle Routing with Stochastic Demands: Properties and Solution Frameworks", Transportation Science, 23(3):166-176, 1989.

Duran, "A large mixed integer production and distribution program", Eur. J. Operational Research, 28:207-217, 1987.

Graves, "Using Lagrangean Techniques to Solve Hierarchical Production Planning", Management Science, 28(3):260-275, 1982.

Klein et al., "Faster Approximation Algorithms for the Unit Capacity Concurrent Flow Problem with Applications to Routing and Finding Sparse Cuts", SIAM, 23:446-487, 1994.

Lamaire et al., "Wireless LANs and Mobile Networking: Standards and Future Directions", *IEEE Communications Magazine*, pp. 1-15, Aug. 1996.

Laporte et al., "The integer L-shaped method for stochastic integer problems with complete recourse", Operations Research Letters, 13(3):133-142, 1993.

Louveaux et al., "Stochastic programming with simple integer recourse", Mathematical Programming, 61:301-325, 1993.

Rana, "A Decomposition Technique for Mixed Integer Programming Problems", Computers Ops. Res., 19(6):505-519, 1992.

Shahrokhi et al., "The Maximum Concurrent Flow Problem", J. Assn. Computing Machinery, 37(2):318-334, 1990.

Tanenbaum, Computer Networks, chapter 3, sections 3.4, 3.4.I, and 3.4.2, pp. 119-121, 1981.

* cited by examiner

ADAPTIVE MEDIA CONTROL

CROSS-REFERENCE TO RELATE APPLICATIONS

This application is a continuation of U.S. application Ser. No. 09/502,143, filed Feb. 11, 2000 now abandoned, which is a continuation-in-part of U.S. application Ser. No. 08/907,812 filed Aug. 14, 1997 now U.S. Pat. No. 6,049,549, and claims the benefit of International Application Serial No. PCT/US98/16836 filed Aug. 13, 1998, each of which is incorporated, herein by reference.

BACKGROUND OF THE INVENTION

This invention relates to media control in a communication network.

Use of shared communication media for network communication typically requires control of those shared media. For example, the media may provide a limited communication capacity and media control, including media allocation and management, provides mechanisms for controlling access by stations on the network to the media in order to provide fair and efficient communication over the network.

Coupling of multiple stations using a wireless local area network (WLAN) can provide the benefits of a wired local area network (LAN) without requiring the stations to be physically coupled using transmission ▯wires▯ such as coaxial conductors, twisted pairs of wires, or optical fibers. Data is transferred using radio frequency (RF) or optical frequency (e.g., infra-red (IR)) transmission through space. Radio-based wireless networks, in general, have several characteristics that differ from wired networks. These characteristics include lower achievable data capacity due to factors including bandwidth and power limitation, time-varying communication capacity that may depend on the particular source and destination of a transmission, and higher error rates, for example, due to interfering signals.

Wireless networks typically use a similar software architecture as wired networks. A multi-layer communication protocol "stack," such as the OSI reference model, is used to implement communication over the WLAN. In current LANs, as in WLANs, the media access control (MAC) layer is responsible for access control of the communication medium. It is the MAC layer, between the communication protocols above the physical layer, that differs most between wired and wireless networks.

Various MAC approaches for WLANs have been proposed. These approaches use techniques including random access and time-, frequency-, or code-division multiple access (TDMA, FDMA, CDMA) in which each wireless station is allocated a portion of the total available communication capacity. For example, the IEEE 802.11 media access control standard is a random access technique that uses a carrier sense with a collision avoidance (CSMA/CA) scheme.

Polling techniques have been used to control access to shared communication resources, such as to a shared communication medium in a communication network. In such polling techniques, stations transmit in response to being polled by a master station in the network. In this way, multiple stations are prevented from transmitting concurrently. Concurrent transmission would, in general corrupt the data being transmitted. A polled station must respond in some way to a polling message before the master station can poll another station. Stations are typically polled in a round-robin manner. In such a round-robin approach, polling messages are sent to all other stations, and responses are sent from those stations, before a station is polled again.

Local area networks are increasingly used to transfer data, including multimedia data streams that have various quality-of-service requirements. Examples of such requirements include a guaranteed minimum data rate and maximum delay. Applications that have such quality-of-service requirements include audio or video telephony and conferencing, multimedia collaboration, and multimedia distribution.

SUMMARY

In a wireless local area network (WLAN) environment, a WLAN media access control (MAC) module can directly address the quality-of-service (QoS) requirements of data streams. Support for QoS requirements is more easily provided at the MAC layer than at higher layers or the protocols. In particular, an adaptive MAC polling approach in combination with a resource manager provides efficient use of limited and time varying communication resources while satisfying QoS requirements, if possible. The approach is applicable to wireless LANs, such as those based on the IEEE 802.11 standard, and is also applicable to wired LANs, such as those based on Ethernet standards, and LANs which use telephone wiring or power wiring for data links.

The invention provides, in general, a media control that supports transmission of data streams with QoS requirements, such as minimum throughput or maximum delay, while adapting to the changing characteristics of the wireless transmission medium. In addition, assignment of limited resources, in particular, the limited communication capacity of the transmission medium, is tightly coupled to the media control approach. The media control approach includes use of a polling manager and a resource manager. The resource manager provides an admission control procedure that prevents admission of sessions that cannot be supported by the system and allocates network resources needed to support admitted sessions. The resource manager allocates bandwidth to sessions by taking into account the data rate requested for the sessions and the achievable throughput. The resource manager can also consider other factors such as utility and priorities of communication sessions. The available bandwidth is taken into account to allow a requested data rate to be achieved despite retransmissions necessitated by interference, physical separation, of other error-causing situations. The polling manager uses an efficient "just in time" polling of stations based on their allocated bandwidth or communication rates. Stations that do not use their allocated rates are polled less often than those which use their allocation, thereby increasing the total throughput of the system and providing proper quality of service support for real-time applications. Advantages of the invention include quality of service support which is needed for real-time multimedia applications, responsiveness to time varying communication capacity, resource allocation in accordance with effective bandwidth between pairs of stations, and admission of sessions only if their minimum required data rates are achievable.

In general, in one aspect, the invention provides media control in a communication network which includes multiple communication stations coupled over a shared communication medium and which supports a quality of service class of communication sessions such that sessions in that class have data rate requirements. Media control includes assigning communication resources in accordance with the data rate requirements of sessions in the quality of service class, polling the stations to transmit data for particular sessions according to a polling sequence, monitoring data transmissions in response to the polling, and adaptively allocating the communication resources in accordance with the monitored data transmissions. Adaptively allocating the communication resources can include adapting the polling sequence used for polling the stations. In addition, one or more of the following features may be included.

Media control can also involve accepting a request to establish a new communication session in the quality of service class, admitting the new session if its data rate requirement can be provided without exceeding a limit on available communication capacity on the shared communication medium, and rejecting the new session if its data rate requirement cannot be provided without exceeding the limit on available communication resources.

The data rate requirements of sessions in the quality of service class may include minimum required and a maximum desired data rates, and may also include maximum intervals between polling of those sessions.

Assigning communication resources as part of media control can include determining a set of sessions in the quality of service class that can be provided with their minimum required data rate, and assigning data rates to each of those sessions in accordance with their minimum required data rates and their maximum desired data rates.

Monitoring data transmission can include collecting data retransmission statistics, and assigning communication resources includes adjusting data rate requirements in accordance with the collected retransmission statistics.

Assigning communication resources can also include optimizing a utility function subject to a set of constraints. The utility function depends on the assigned rates. The set of constraints includes the assigned rate for each admitted session being in the range from its minimum required data rate to its maximum desired data rate and the assigned data rates taken together not exceeding an available communication capacity.

Polling of sessions can be such that sessions with lower assigned data rates are polled less frequently than stations with higher assigned data rates. Also, adapting the polling sequence can include reducing the rate of polling for a session in response the monitored transmissions for that session corresponding to a reduction in actual rate of transmission for that session, and increasing the rate of polling for a session in response the monitored transmissions for that session corresponding to an increase in actual rate of transmission for that session. Polling can be performed in a periodic cycle and during each period of the cycle a subset of the sessions in the quality of service class are polled in accordance with their allocated communication resources. The polling sequence can be determined by the values of state variables, each associated with a corresponding session, and adapting the polling sequence can be effected by changing the values of the state variable. Polling a station to transmit data for a particular session can include assembling a data message identifying the session, transmitting the data message to the station using either a radio frequency or an optical frequency transmitter, and monitoring data transmissions can includes receiving the data transmissions using either a radio frequency or an optical frequency receiver.

Other features and advantages will be apparent from the following description, and from the claims.

DETAILED OF THE PREFERRED EMBODIMENTS

Figure 1:
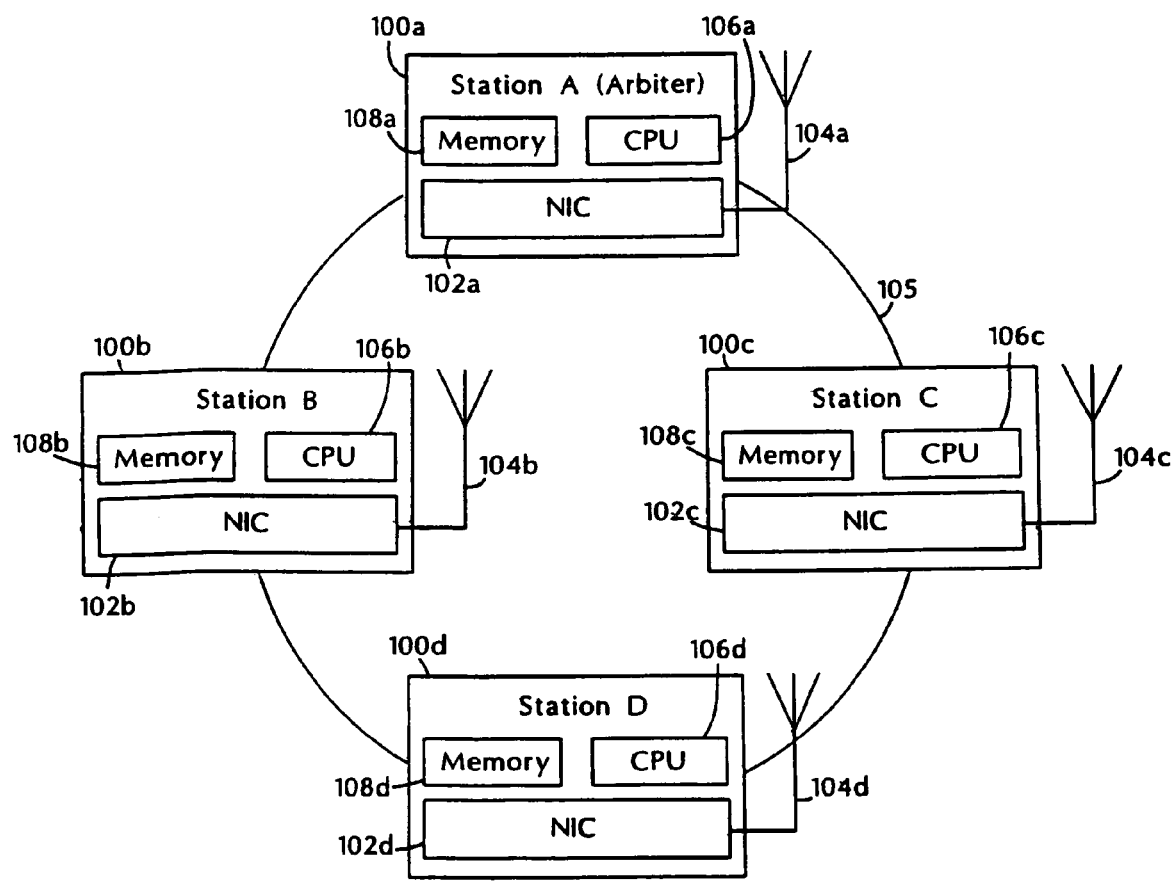
FIG. 1 shows an exemplary arrangement of stations coupled over a wireless network.

A first embodiment of the invention involves communication among a number of stations over a wireless local area network (WLAN). FIG. 1 shows an exemplary arrangement of four stations 100*a-d* which communicate in a WLAN over a broadcast wireless medium 105, such as radio frequency propagation through the interior space of an office building. Stations communicate directly with one another through broadcast medium 105. Embodiments of the invention use a variety of radio or optical frequencies and transmission methods. In this first embodiment, the stations communicate using radio frequency spread spectrum transmission in the Industrial Scientific and Medical (ISM) band in the range of 2.4 GHz using an overall bandwidth of approximately 83 MHz. The transmission technique provides a raw system data rate of 1 Mb/s between stations. The transmission characteristics between stations 100*a-d* depend on a variety of factors including the transmission power at a station, the physical distance and interfering physical structures between stations, and the nature of interfering signal sources. In addition, these transmission characteristics can change during operation, due, for example, to a station's or a physical barrier's moving. As a result, the achievable throughput over the channel may be substantially lower than the raw data rate and may also vary over time.

As shown in FIG. 1, wireless stations 100*a-d* include network interface controllers (NICs) 102*a-d* coupled to antennas 104*a-d*. They also include general purpose central processing units (CPUs) 106*a-d* and memories 108*a-d*. Application programs execute on the CPUs and communicate over the WLAN through the NICs. Memories 108*a-d* are used for application storage. The stations can be a variety of devices such as personal computers, computer peripherals, gateway devices to other networks, or any other of devices that require data communication services.

In this first embodiment, one station (e.g., station 100*a*) is designated as the arbiter station. The arbiter station is responsible for managing allocation and use of communication resources. As will be described further below, arbiter station 100*a* accepts requests to admit communication sessions into the system, assigns communication rates to admitted sessions and, in accordance with their assigned communication rates, polls stations to transmit data for particular sessions.

In general, the arbiter session polls sessions frequently enough to sustain the assigned communication rates for those sessions, but does not poll substantially more often than required to sustain the assigned rates. This polling approach avoids use of bandwidth with the overhead of unnecessary polling.

Sessions belong to one of two classes. The first class includes sessions with rate or delay related quality-of-service requirements. This class is referred to as the QoS class. The other class of sessions is the non-QoS class. The arbiter station allocates resources to QoS sessions in preference to non-QoS sessions. In polling, the QoS sessions are polled to satisfy their QoS requirements while non-QoS sessions are polled as a second priority. Other embodiments may have multiple QoS classes where the QoS classes are ordered by their priority.

A QoS session may be used, for example, to transmit motion video data or other multimedia information. If a minimum data rate were not maintained for such a QoS session, the signal would be unacceptably degraded. Non-QoS sessions are used for data transfers that are not time critical. For example, a file transfer does not require a sustained minimum transfer rate.

The arbiter station may also penalize sessions that do not consume their allocated data rates by polling them less often. This reduced polling frees up communication capacity for other sessions.

An additional feature of the polling approach is that QoS sessions at a station always takes priority over non-QoS sessions at that station. Therefore, when the arbiter station polls non-QoS session at a station, that station may substitute transmission of a QoS session. Also, a station always sends some data in response to a poll unless the station has no pending data for any session of any class.

In this embodiment data in a communication session is transferred directly between stations without the intervention of the arbiter station (i.e., the arbiter station does not in general route data). A station receiving data responds directly after receiving the data with either an acknowledgment (ACK) or a negative acknowledgment (NACK) message to the sender indicating a correct or erroneous receipt of the data. If a NACK is received, or a timeout expires with neither an ACK nor a NACK's being received, a link layer retransmission protocol is used by the sending station to retransmit the data when that session is next polled. As the arbiter station can monitor transmission between any two stations, explicit acknowledgment of a polling message from the arbiter is not always needed. Moreover, by monitoring the transmission between any two stations participating in a session, the arbiter station can collect retransmission statistics about this session to estimate the achievable throughput between the two stations. These statistics are used by the resource manager to provide proper admission control and bandwidth allocation.

Figure 2:
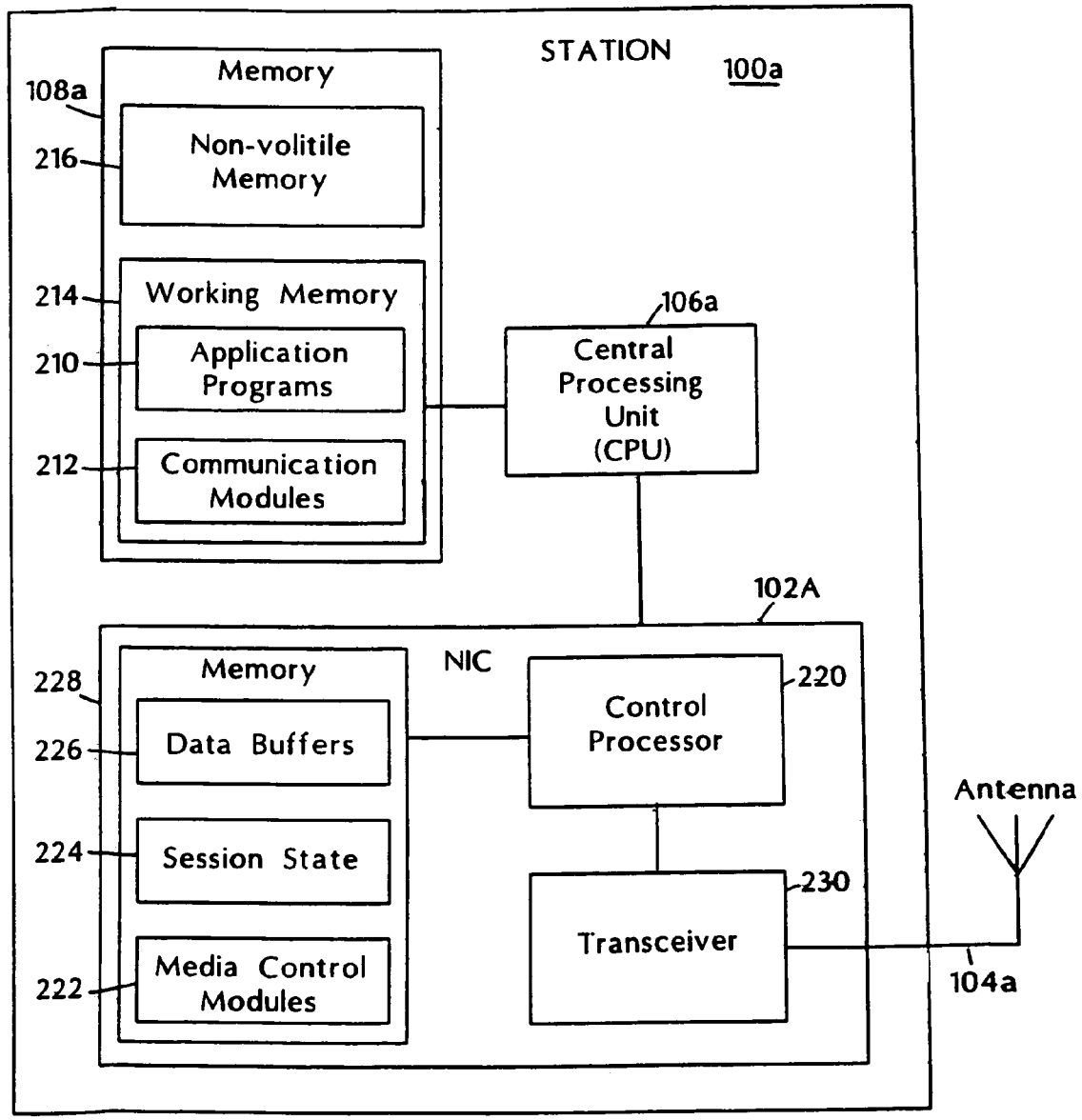
FIG. 2 shows elements of a wireless station.

FIG. 2 shows the arrangement of the hardware components of a representative wireless station, in this case arbiter station 100a. General purpose CPU 106a executes application programs 210 and communication modules 212 stored in working memory 214 such as dynamic RAM. Non-volatile memory 216, typically a magnetic disk or read-only memory (ROM), is used to store application programs and communication modules prior to initialization of the station. CPU 106a communicates with network interface controller (NIC) 102a. In this embodiment, NIC 102a is coupled to CPU 106a using a PCMCIA bus. In other embodiments the NIC may be coupled to the CPU in any one of a variety of different ways including over an ISA bus, or a parallel or serial port. NIC 102a includes a control processor 220 which communicates with CPU 106a. NIC 102a has a memory 228 which is used for data buffers 226, session state for active sessions 224, and media control modules 222 which execute on control processor 220.

Control processor 220 communicates with transceiver 230 which is coupled to antenna 104a. Transceiver 230 converts a baseband data signal into the radio frequency signal transmitted through antenna 104a and converts a radio signal received at antenna 104a into a baseband data signal. A variety of transceivers can be used in embodiments of the invention. For example, in this first embodiment, transceiver 230 includes a Harris Semiconductor ▯PRISM▯ chipset that includes a quadrature modem, a voltage controlled oscillator, an RF/IF converter, a RF power amplifier with transmit/receive switch, and a low noise RF amplifier. The chipset implements a direct sequence (spread spectrum) transmission technique to reduce interference from other transmission sources.

Figure 3:
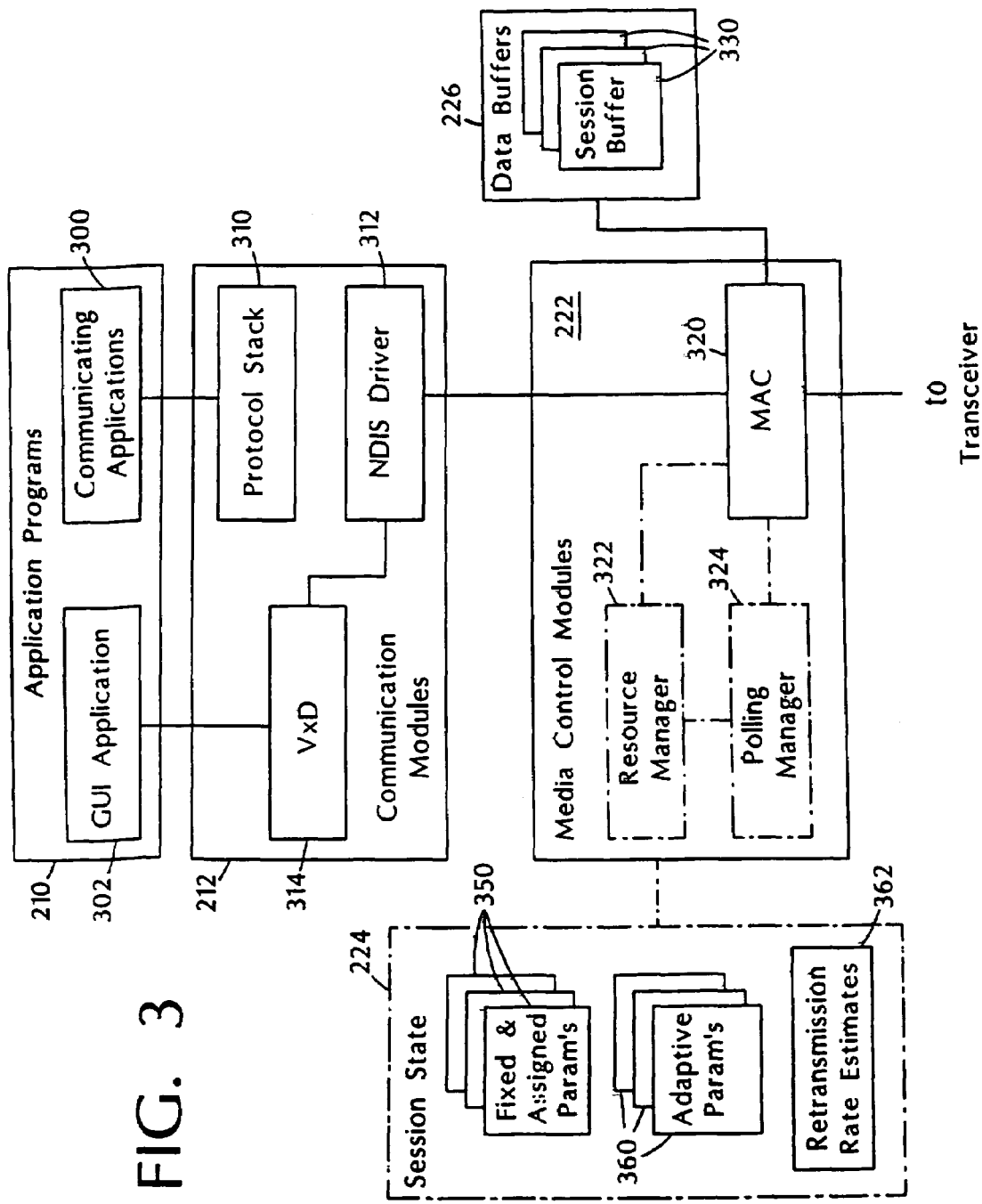
FIG. 3 shows software modules which execute on a wireless station.

FIG. 3 shows the arrangement of software modules on an arbiter station, such as station 100a shown in FIG. 1. The arrangement of software modules on a non-arbiter station, such as stations 100b-d, is the same except that elements indicated with broken lines in FIG. 3 are not included. The description below of the elements shown in FIG. 3 is applicable to both arbiter and non-arbiter stations unless noted otherwise.

Application programs 210 include a graphical user interface (GUI) application 302 and communication applications 300. Communication applications 300 communicate with applications executing at other stations. GUI application 302 is used by a user to interactively control QoS requirements of communication sessions involving communication applications 300. Each session involves a single unidirectional data stream between two stations. Each QoS session that is admitted is promised either a minimum data rate or a maximum delay between polling, or both. The arbiter station endeavors to maintain a promised minimum data rate, even during periods when the overall system capacity is reduced due, for example, to an interfering signal.

Each session communicates through a standard communication protocol stack 310, implementing in this embodiment TCP/IP and UDP/IP protocols. The stations operate using the Microsoft Windows 95 or Windows NT operating system. Protocol stack 310 is provided by Microsoft Corporation for use with the Windows 95 and NT operating systems. Application programs 210 communicate with protocol stack 310 using standard techniques for the Windows operating systems.

Protocol stack 310 communicates with the Network Driver Interface Specification (NDIS) driver 312 that provides the interface to media control modules 222 executing on the Network Interface Controller (NIC). In addition to providing a standard interface for higher layer protocols, an NDIS driver contains code that controls the NIC. Higher level protocols, implemented in protocol stack 310, use calls to the NDIS driver to submit data packets for transmission to the network or to retrieve data received from the network. When packets arrive from the network, media control modules 222 pass them to the low level controller code in the operating system which then calls NDIS driver routines to forward these packets for processing by protocol stack 310.

In this embodiment, protocol stack 310 does not have explicit provisions for supporting QoS sessions. Therefore, a second control path is provided to NDIS driver 312 through virtual device driver VxD 314. GUI application 302 accepts control information from a user and passes this information through VxD 314 to NDIS driver 312. For example, a user may specify using GUI application 302 that all data streams addressed to a particular IP port (i.e., to a particular IP socket number on a remote host) on other stations have a particular minimum data rate and maximum delay requirement, and a maximum data rate that can be used. This information is passed to NDIS driver 312 which in turn tags packets that arrive from protocol stack 310 and are transferred to media control modules 222. In this way, media control modules are able to differentiate between QoS and non-QoS sessions.

MAC 320 in media control modules 222 stores the data received from communication modules 212 in data buffers 226. Data buffers 226 include separate session buffers 330, one for each session.

MAC 320 waits to receive a Permission-To-Send (PTS) message initiated by a polling manager 324 at the arbiter station before sending data in data buffers 226. On a non-arbiter station, the MAC receives a PTS message from the polling manager on the arbiter station via the WLAN. On the arbiter station, MAC 320 receives a PTS message directly from polling manager 324.

On the arbiter station, media control modules 222 include polling manager 324 and a resource manager 322. Resource manager 322 maintains session state 224 which includes fixed and assigned session parameters 350 for each session, adaptive parameters 360 for each session, and retransmission rate estimates 362 for pairs of stations. Fixed parameters for a session may include the minimum achievable data rate required and the maximum achievable data rate that can be used by the session, as well as the maximum allowable delay, while the assigned parameters for a session include the assigned data rate. Adaptive parameters 360 are used to track a session□s actual communication pattern and to adjust the polling pattern to avoid unnecessary polling.

After describing the operation of the system when communication sessions have already been established and data rates assigned, we then describe the procedure for adapting to the pattern of data transmissions from individual stations, the procedure for assigning resources, and finally the procedure used to establish a new session.

Polling manager 324 at the arbiter station of the WLAN polls sessions on the stations in the WLAN by sending PTS messages for individual sessions to the MAC on the station sending the session. If communication applications at a station have multiple active sessions for transmission to other stations, the polling manager polls the station separately for each session.

Figure 4:
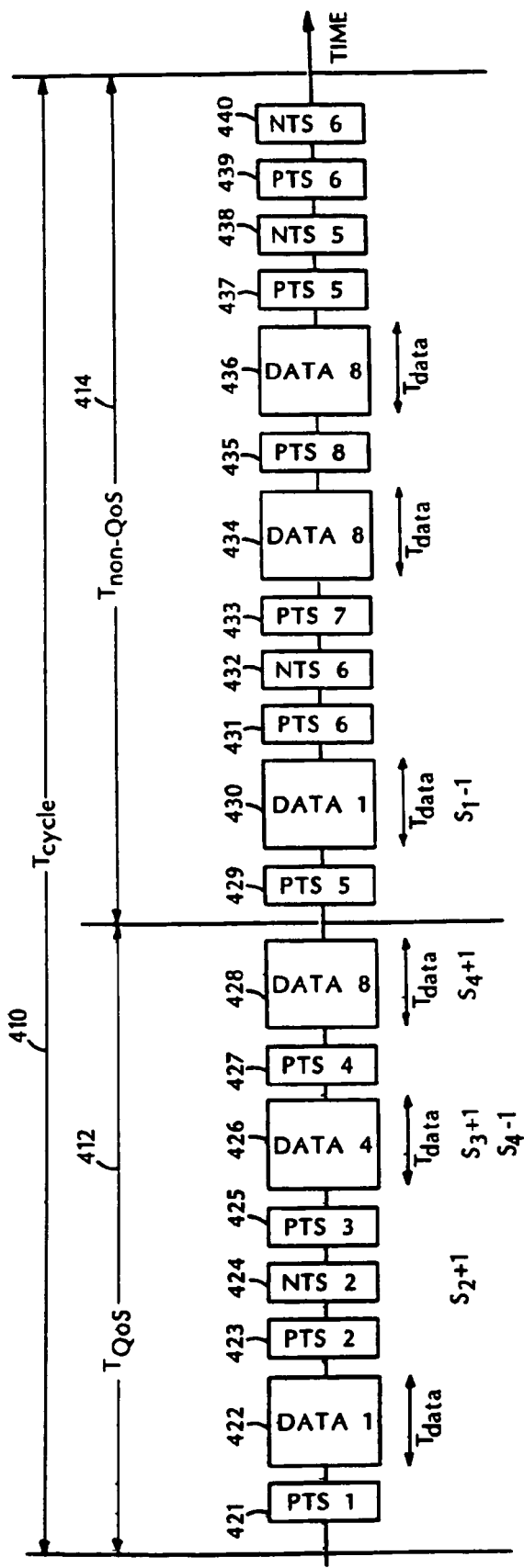
FIG. 4 shows an exemplary transmission cycle in which an arbiter station polls QoS and non-QoS sessions.

Referring to FIG. 4, the polling manager polls by repeating a fixed-duration polling cycle of duration $T_{cycle}$ 410. During one cycle, there is a first QoS phase of duration $T_{QoS}$ 412, followed by a non-QoS phase of duration $T_{non-QoS}$ 414. The durations of the QoS and non-QoS phases vary from cycle to cycle, but the sum of their durations remains fixed at $T_{cycle}$. During both phases of the cycle, the following sequence of transmissions is repeated:

a) The arbiter station transmits a Permission-to-Send (PTS) message that indicates which session is permitted to transmit;
b) The station that is sending that session either:
   i) transmits a data packet for the indicated session,
   ii) transmits a data packet for some other session, or
   iii) transmits a Nothing-To-Send (NTS) message indicating that it has no data to transmit.
c) If the station transmits data in step b-i) or b-ii) and the data is received, the receiving station transmits either an ACK or a NACK, depending on whether the data was correctly received.

Before the arbiter station initiates the sequence for the next session, it waits to receive a NTS, ACK or NACK message, or to time out, for example, due to the PTS, NTS, ACK or NACK message being lost.

During the first, QoS, phase, the PTS messages from the arbiter indicate QoS sessions, while the PTS messages in the second, non-QoS, phase indicate non-QoS sessions. Note, however, that although a PTS message may indicate a QoS session in step a), data transmitted in step b-ii) may be for a non-QoS session if the transmitting station has no data buffered for QoS sessions. Similarly, a PTS message indicating a non-QoS session in step a) may result in QoS sessions being transmitted in step b-ii) if the transmitting station has a backlog of data for QoS sessions. The arbiter station monitors transmissions in step b) and repeats the sequence when the transmission in step b) terminates. During the first phase, the arbiter polls QoS sessions at most once. The polling restarts as soon as the cycle duration $T_{cycle}$ elapses. If the polling of non-QoS sessions completes before the end of the cycle duration, the non-QoS sessions are polled again, terminating at the end of the cycle's duration.

Figure 6:
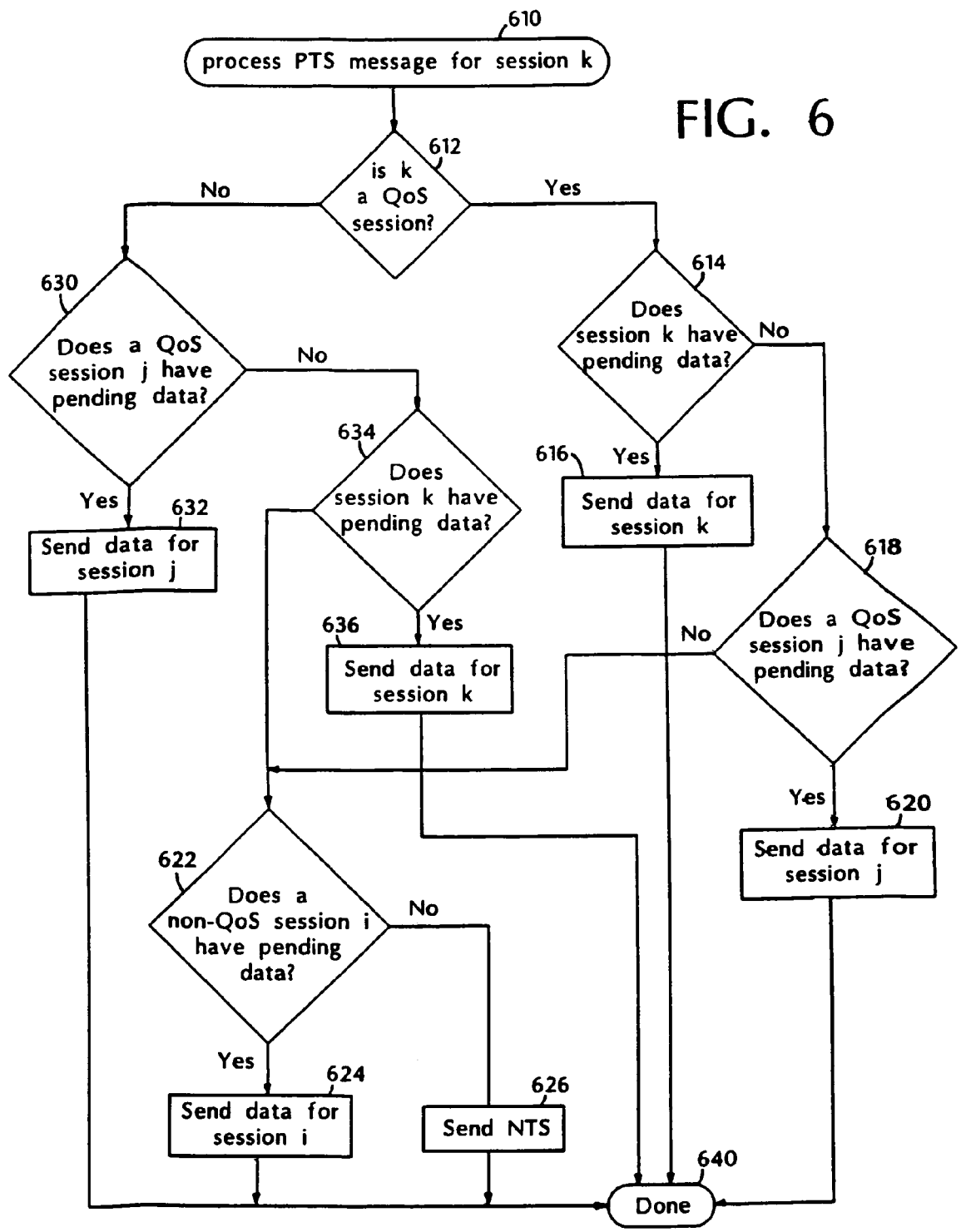
FIG. 6 is a flowchart showing processing of a Permission-To-Send (PTS) message.

Before returning to a discussion of FIG. 4, consider the flowchart in FIG. 6. A MAC receiving a PTS message for a session performs a series of tests to determine which data in its data buffers to transmit. Associated steps in the flowchart are indicated by the parenthesized numerals below. The MAC processing a PTS message for a session k first checks if session k is a QoS session (612). If it is, the MAC checks if there is data pending in the data buffers for session k (614) and if there is, transmits data for session k (616). If session k does not have pending data, a check is made if some other QoS session j has pending data (618) and if there is, data for QoS session j is transmitted (620). If there are no pending QoS sessions, the MAC checks if there is a non-QoS session with pending data (622) and if there is, data for non-QoS session i is transmitted (624). If no data is pending for transmission, an NTS message is sent (626). If session k is a non-QoS session (612), a check is made if any QoS session j has pending data (630), and if it does, data from that session j is transmitted (632). Otherwise, if session k has pending data (634) data for session k is transmitted (636). If session k does not have pending data, data for some other non-QoS session i is transmitted (624) or an NTS message is sent (626) if there is no pending data for any session.

In order to more fully understand the polling operation, consider the sequence of transmissions illustrated in FIG. 4. This example shows the arbiter polling eight active sessions originating at three stations, B, C and D. Sessions 1-4 are QoS sessions and sessions 5-8 are non-QoS sessions. The state of the sessions originating at each of the three stations in this example is as follows:

Station B:
   QoS session 1 has two pending data packets in its transmission buffer,
   non-QoS session 5 has no data in its buffer.
Station C:
   QoS session 2 has no data in its buffer,
   non-QoS session 6 has no data in its buffer.
Station D:
   QoS session 3 has no data in its buffer,
   QoS session 4 has one pending data packet,
   non-QoS session 7 has no data in its buffer,
   non-QoS session 8 has a large amount of pending data.

The series of polling sequences is illustrated in FIG. 4. Each polling sequence includes a transmission of a PTS message (step a) followed by a transmission by the polled station (step b). The transmission of ACKs or NACKs (step c) is not shown in the figure. The series of these sequences is illustrated as follows. The parenthesized numerals refer to the transmissions illustrated in FIG. 4.

1a. A PTS message for QoS session 1 is sent to station B (421).
1b. Station B sends data for session 1 (422).

2a. A PTS message for QoS session 2 is sent to station C (423).

2b. Station C has no data buffered for session 2. Station C does not have any data buffered for any other QoS session, nor does it have data buffered for a non-QoS session. Station C therefore responds with an NTS message (424).

3a. A PTS message for QoS session 3 is sent to station D (425).

3b. Station D has no data buffered for session 3. It does however have data buffered for QoS session 4 which it transmits (426).

4a. A PTS message for QoS session 4 is sent to station D (427).

4b. Station D had one pending data packet for session 4 at the beginning of the cycle, but it was already transmitted. Station D has no other pending QoS packets. It does have a non-QoS packet for session 8, which it transmits (428).

5a. A PTS message for non-QoS session 5 is sent to station B (429).

5b. Station B has pending QoS sessions for session 1 which it transmits (430).

6a. A PTS message for non-QoS session 6 is sent to station C (431).

6b. Station C has no pending data and therefore transmits an NTS message (432).

7a. A PTS message for non-QoS session 7 is sent to station D (433).

7b. Station D has no pending QoS sessions and no pending data for session 7. It does have pending data for non-QoS session 8 which it transmits (434).

8a. A PTS message for non-QoS session 8 is sent to station D (435).

8b. Station D has no pending QoS sessions. It transmits a packet from non-QoS session 8 (436).

9a. The cycle of non-QoS sessions repeats with a PTS message for non-QoS session 5 is sent to station B (437).

9b. Station B has no remaining pending QoS packets, and no pending non-QoS packets. Station B therefore transmits an NTS message (438).

10a. A PTS message for non-QoS session 6 is sent to station C (439).

10b. Station C has no pending data and therefore transmits an NTS message (440). This transmission completes the cycle since the overall duration $T_{cycle}$ has elapsed.

In this embodiment, the duration of the polling cycle, $T_{cycle}$, is fixed, as is the duration of any data message, $T_{data}$. A session that is polled once every cycle therefore receives a fraction $T_{data}/T_{cycle}$ of the overall system capacity. For illustration, if the overall system communication rate is 1 Mb/s, then $T_{data}=1$ ms and $T_{cycle}=4$ ms would yield a data rate of approximately 256 kb/s for a session polled once every cycle. Such a choice for $T_{data}$ and $T_{cycle}$ would support up to 4 sessions transmitting per cycle if PTS messages, NTS messages, and switching time between transmitting and receiving modes take essentially no time. As these other transmissions do take time, less than 4 sessions can transmit in practice for this choice of $T_{data}$ and $T_{cycle}$.

This embodiment includes a mechanism for avoiding unnecessary polling and thereby increasing the amount of each cycle used on average for data transmissions. For example, if the maximum session data rate is 256 kb/s and a session is allocated 64 kb/s, that session can be polled every fourth cycle and still be provided its allocated data rate. Each QoS session k has a session state index $S_k$, such that $1/S_k$ is equal to the fraction of cycles in which that session is to be polled. The value of $S_k$ for a session is initially determined by the resource manager such that the session's allocated rate can be satisfied by the resulting polling pattern.

As introduced above, this embodiment also includes an adaptive mechanism that is used by the polling manager to adjust the polling pattern for a session in response to that session's actual data transmissions. If a session does not have data ready for transmission when polled, that session may not require polling as often in the future to support it's actual data rate. Similarly, when data for a session is provided in response to PTS messages for another session, this is an indication that the session is backlogged and requires polling more often in the future.

Figure 5:
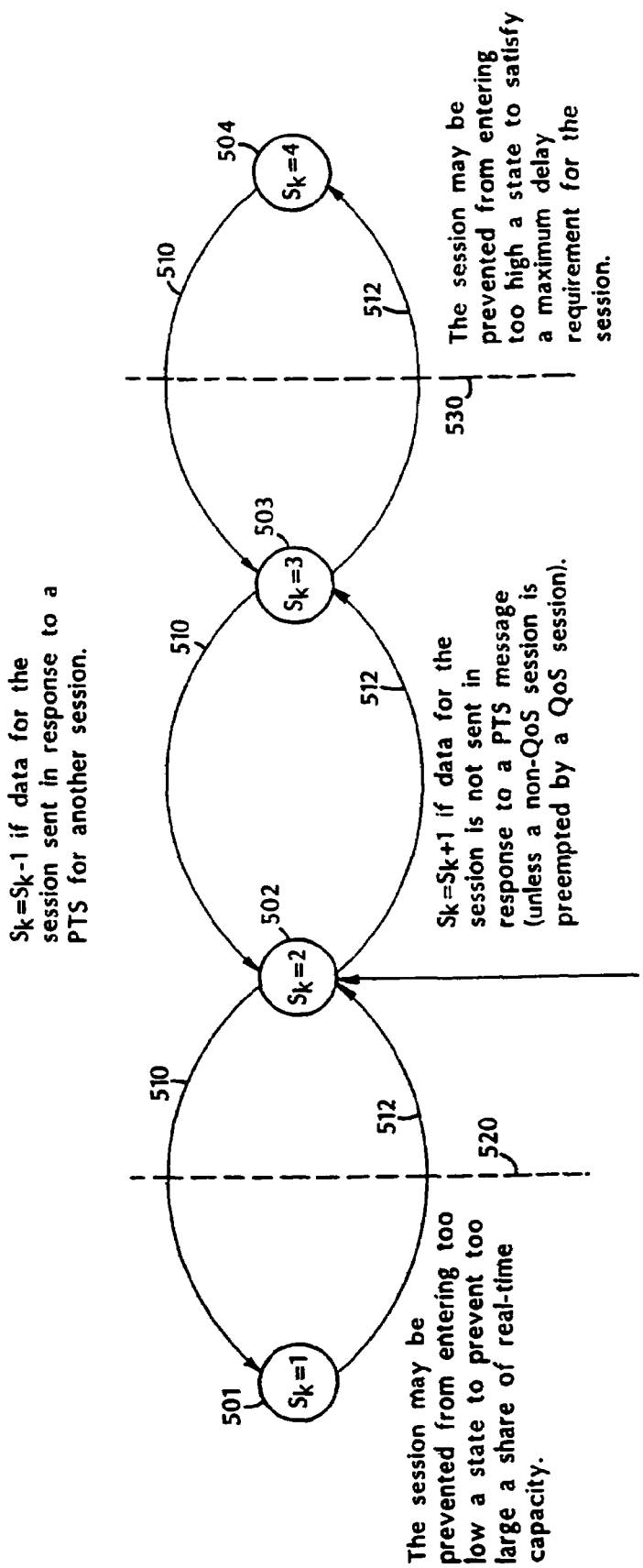
FIG. 5 illustrates a state machine used to adapt the polling pattern for a session in response to data transmissions for that session.

Referring to FIG. 5, each session k is associated with a finite-state machine consisting of a chain of four states 501-504, having state values $S_k$ equal to 1 through 4, respectively. If a session is in state $S_k=1$, that session is polled once during every cycle. If it is in state $S_k=2$, it is polled every other cycle, in state $S_k=3$, once every 3 cycles, and in state $S_k=4$, every 4 cycles.

In general, the state $S_k$ of a session k is changed in two situations:

1) The state index $S_k$ is reduced by 1 whenever a data packet for session k is transmitted in response to a PTS message for some other session, (state transitions 510) and 2) If session k is a QoS session, and a data packet for session k is not transmitted in response to a PTS message for session k, then the state index $S_k$ is increased by 1 (state transitions 512).

Referring again to FIG. 4, the polling manager increases the state $S_2$ for session 2 by 1 after transmission of NTS message 424 since no data is transmitted for session 2 in response to PTS message 423 indicating session 2. Similarly, the polling manager increases $S_3$ by 1 after transmission of data 426 for session 4 in response to PTS message 425 indicating session 3. In addition, the polling manager reduces $S_4$ by 1 after transmission of data packet 426 since data for QoS session 4 is transmitted by station D in response to PTS message 425 for a session other than session 4, session 3 in this case. Following the same rules, the polling manager increases $S_4$ by 1 after transmission of data packet 428, and reduces S, by 1 after transmission of data packet 430. If a session is already in state 1, the state index is not reduced. Similarly, if the state index is at it's highest value, 4 in this embodiment, the state index is not increased.

In addition to limiting the state index to be in the range 1 to 4, the polling manager uses a supplementary policing mechanism to limit the rate of polling for a session. This policing mechanism determines the minimum state index that a session can be in. This limitation is imposed on a session by the polling manager when the session exceeded its allocated data rate for a period of time. For example, as illustrated in FIG. 5 by line 520, the polling manager does not allow the state for the session to go below 2 thereby limiting the peak data rate to ▯of the maximum session data rate. This prevents a session from using an unfair portion of the overall system data capacity. This limit is removed after the session does not exceed its allocated rate for a specified period of time.

In order to guarantee a maximum delay requirement, the state index of a session may be prevented from being too high. For example, if the duration of a cycle, $T_{cycle}$, is 4 ms and a session requires a maximum delay of 15 ms, then the state index must be 3 or less, as illustrated with line 530 in FIG. 5. If the state index were 4, the session would be polled once every four cycles, or every 16 ms, which would not satisfy the maximum delay constraint.

Periodically, resource manager 322 (shown in FIG. 3) reallocates data rates for all sessions. If no new sessions have been admitted, reassignment may still be needed, for example due to changing transmission characteristics resulting in a new retransmission rate for some session.

Referring again to FIG. 3, GUI application 302 accepts QoS requirements for QoS sessions from a user. In this embodiment, these include one or more of a minimum required data rate $r_k$, a maximum data rate $R_k$, and a maximum delay $M_k$. These requirements are transmitted through VxD 314 and NDIS driver 312 to resource manager 322 at the arbiter station when a session is to be considered for admission and is stored in fixed and assigned parameters 350 for subsequent reallocation of data rates.

GUI application 302 accepts a quality of service requirement from a user for a session either by the user explicitly specifying the requirement for the session, such as by specifying a minimum data rate, or by choosing from a pre-determined set of classes of sessions. Such classes can be defined by a number of quality of service metrics, such as a maximum and minimum data rate, maximum delay, security, compression, or any other communication related parameters. When a specific class is chosen, GUI application 302 translates the class into pre-determined parameter values or range of parameters values to that class.

Quality of service requirements can include security-based requirements. For example, three classes may be defined for security requirements: high security, medium security and low security. A high security class means that the data transmitted using very powerful encryption methods with appropriate authentication. Encryption may change the amount of data that needs to be transmitted or other parameters such as time delay. Therefore, the security requirements for a session are used to compute the raw transmission rate and other parameters needed to support the session.

Resource manager 322 also maintains retransmission rate estimates 362 for each pair of stations by monitoring transmissions between stations and noting when data is NACKed rather than ACKed, and when a timeout occurs waiting for transmission of a data packet or an ACK or NACK by a receiving station. For each admitted or considered session k, resource manager 322 computes $A_k$, the expected number of transmissions (including the initial transmission as well as retransmissions of a packet) per successful transmission. The resource manager then uses these retransmission rate estimates to determine the adjusted minimum and maximum data rates, denoted by $d_k = A_k r_k$ and $D_k = A_k R_k$ respectively, for each session. Note that these adjusted rates may change in future reallocations as the retransmission rate estimates change. The resource manager assigns a rate $X_k$ for each session k without exceeding the overall system data rate $U_c$. If $\Sigma_k D_k < U_c$, then all sessions can be allocated their maximum adjusted desired rates. If $\Sigma_k d_k > U_c$ then there is no feasible solution of assigned rates that will give all the QoS sessions their minimum required rates. Assuming a feasible solution exists, the resource manager assigns each session k a data rate $X_k$ (not counting retransmissions) which satisfies $r_k \leq X_k \leq R_k$. If a feasible solution exists but all sessions cannot be assigned their maximum desired rates, rates $X_k$ are allocated such that the adjusted excess rates $X_k$ beyond the minimum rates $r_k$ are assigned proportionally to the differences $R_k - r_k$. That is, excess rates $X_k' = X_k - r_k$ are proportional to $R_k' = R_k - r_k$ for all k. Therefore, if $U_c' = U_c - \Sigma_k d_k$, then $X_k = (1/A_k)(d_k + U_c'(A_k R_k'/\Sigma_i A_i R_i'))$.

If the resource manager cannot find a feasible set of assigned rates $X_k$, then it removes one or more QoS sessions from the set of sessions polled during the first phase of each cycle. For example, sessions with the highest data rate requirements may be removed first.

In order to account for overhead due to factors such as header information in a data transmission and the time needed by transceivers to switch between receiving and transmitting modes, the total communication capacity $U_c$ is reduced from the transmission rate B using an efficiency factor E. To illustrate this, consider the situation as follows: the raw data rate is B=1 Mb/s; data transmissions are $T_{data}$=1 ms in duration resulting in transmissions of length $B \cdot T_{data}$=1 Mb/s·1 mS=1 kb; polling and acknowledgment messages are insignificant in duration; transceiver switching takes $T_{switch}$=0.01 ms and the transceiver switches twice per data transmission (i.e., once to switch from receiving to transmitting and once to switchback); and header information uses h=32 b. In this situation, the efficiency factor is $E = T_{data}/(T_{data}+2\ T_{switch}) \cdot (1+h/B \cdot T_{data})$, which is approximately 95%.

After computing the allocated data rates, the rates and the maximum delay requirements are transferred from the resource manager to the polling manager. The initial state for each session is chosen so that the session is polled as infrequently as possible while still supporting the allocated rate and that satisfies the maximum delay requirement.

Referring again to FIG. 3, when one of the communicating applications 300 wants to establish a new session, it opens a data stream using protocol stack 310. This request is transferred through the NDIS driver 312 and on to MAC 320. If the user wants the session to be a QoS session, the user provides QoS parameters to GUI application 302 which communicates those parameters through VxD 314 and NDIS driver 312 to MAC 320. MAC 320 then waits to be queried by resource manager 322 at the arbiter station for requests to establish new sessions.

Periodically, resource manager 322 at the arbiter station queries the MACs at all stations for new QoS sessions. Requests to establish QoS sessions are accompanied by QoS requirements including the minimum and maximum effective data rates $r_k$ and $R_k$ required for the session.

Resource manager 322 at the arbiter station considers whether a feasible solution to the resource assignment problem can be obtained with the new QoS session being considered for admission into the system. If a feasible solution cannot be obtained which includes the new sessions, one or more of the requested QoS sessions is not admitted, for example in order of decreasing minimum required data rate, and a feasible solution is again attempted. This is repeated until a feasible solution is obtained. Therefore, at least at the time that a session is admitted, the resource manager expects that at least the minimum required data rate can be provided to all existing and newly admitted QoS sessions. The arbiter station communicates acceptance or rejection of a QoS session to the MAC 320 on the requesting station, which in turn informs GUI application 302 through NDIS driver 312 and VxD 314.

When a session is closed by an application program, the sending station signals the end of the session to the arbiter station and no further resources are assigned to the session. Alternatively, if the sending station simply stops sending, the state index for the session will adapt to the highest value. After a predetermined time at that value during which time no data is transmitted for the session, the arbiter station notifies the sending station that the session has been terminated and frees resources associated with that session.

A second embodiment of the invention admits and allocates data rates for both QoS sessions and non-QoS sessions according to an overall utility function. In addition to specifying minimum and maximum data rates $r_k$ and $R_k$ for a session k, a user also specifies a priority (or utility) $P_k$ for the session. In addition, non-QoS sessions k also have requirements $r_k$, $R_k$ and $P_k$ specified, although in general $P_k$ is lower than that used for QoS sessions, and $r_k$ may be zero if a sustained data rate is not required.

The overall utility function in this second embodiment is $\Sigma_k P_k X_k$. This utility function is maximized subject to the constraints that $r_k \leq X_k \leq R_k$ for all sessions k and $\Sigma_k A_k X_k \leq U_c$. This Linear Programming formulation is a version of the well-known [knapsack] problem. The optimal solution is found by ordering the sessions in descending order according to $P_k/A_k$. Sessions are allocated in order. Unless the communication capacity $U_c$ is reached, each session receives it[]s maximum desired data rate $X_k = D_k$. The last session allocated receives whatever data rate is available (given that the data rate available is at least the minimum required data rate for the session) and the remaining sessions are allocated zero data rate. Note that since the retransmission rate $A_k$ is considered as well as the priority $P_k$ of a session, a high priority session with a high retransmission rate may not receive its required data rate while a low priority session with a low retransmission rate may.

In an alternative embodiment each session can have a penalty or cost $P_k$ associated with it. An overall penalty function, of the same form as the overall utility function above, is minimized in this case.

Other embodiments involving optimization of an overall utility or penalty function can include other constraints. An example of other constraints would be reservation of a percentage of the overall communication rate for non-QoS sessions. In addition, other linear programming solution techniques can be employed to find feasible solutions.

Other embodiments of the invention can incorporate one or more of the following features. For example, the cycle time $T_{cycle}$ can be modified during operation to reflect the highest data rate actually assigned to a session rather than remaining fixed.

QoS sessions can also be prioritized as in the second embodiment, but excess data rates beyond the minimum required for each session can be assigned first to the highest priority QoS sessions, rather than proportionally to the excess demands of all QoS sessions as in the first embodiment. Excess data rates can be assigned also to non-QoS sessions.

An alternative finite state machine can be used to adapt the polling pattern for a session. For example, the chain of states can be extended to a larger number of states than the four of the first embodiment. Also, transitions from a current state to a state with an index two or more smaller than the current state can be used allowing faster response to a QoS session that has a burst of transmissions.

As an alternative to, or in addition to, changing the states of a session based on monitored transmissions for a session, the arbiter can use other statistics related to that session. For example, a station can provide the number of pending packets for a session (queue length) and the arbiter can reduce the state by one or more (i.e., increase the frequency of polling) for that session if the queue length is high. This allows the polling pattern for a session to be adapted by the arbiter more quickly than if the monitored transmission pattern from the station were used alone. Other statistics, such as maximum delay or age of packets in a session's queue can also be used. The station can provide session-related statistics in response to an arbiter's polling, or in some other way such as indicating the statistics for a session with data messages for that session.

A variable amount of data can be transmitted by a station in response to a poll. In one approach, the arbiter station sends a station group polling message to permit a station to transmit data packets for each of a set of sessions rather than sending a separate polling message for each session. In another approach, the arbiter sends a system group polling message which is received by all stations. The stations each transmit data for their sessions in turn. The stations transmit in a prescribed order and each station waits for the previous station in the order to complete its transmissions before transmitting.

In the situation that a previously admitted QoS session cannot be accommodated in a feasible solution when data rates are reassigned by resource manager 322, the sending station can be informed that a previously admitted session has been ejected. The application program associated with that session can then take appropriate action. In addition, it is possible if sessions are prioritized, that a request for admitting a new QoS session results in that session being admitted but some other previously admitted but lower priority session being ejected.

In yet another embodiment, although at any one time there is a single arbiter station, one or more stations perform the identical resource assignment procedure in parallel and function as shadow arbiter stations. In this way, these stations are able to become the arbiter station if for some reason the arbiter station cannot serve that role.

In the embodiments described above, the arbiter station can also execute application programs. The arbiter station can also solely serve the role of an arbiter station without the ability to execute application programs. In addition, such a dedicated arbiter station can also serve a gateway role to another network, such as a wired LAN.

The stations do not necessarily communicate directly with one another. For example, in an application such as a use of wireless communication for the local loop of a telephone system to fixed locations, an arbiter can poll a station at each location and that station can communicate with the arbiter.

In other applications, multicast transmission may be used to reach a number of stations with the same communication session. Bandwidth is allocated as in the point-to-point case described previously with the exception that the worst-case retransmission rate is used to estimate the bandwidth needed to sustain the required actual data rate.

As support for QoS requirements is introduced into standard communication protocol stacks, such as into protocol stack 310 in FIG. 3, applications may be able to specify QoS requirements directly. In that case, GUI application 302 and VxD 314 would not be needed to provide QoS requirements. Media control modules 222 in FIG. 3 would operate as in the above embodiments.

Other embodiments can have any of a variety of hardware configurations at the stations. For example, a single processor can serve the roles of the CPU 106a and control processor 220 shown in FIG. 2.

Alternative arrangements of processors, memory, and other hardware components can be used. Referring to FIG. 2, NIC 102a includes a control processor 220 which implements the media control protocol. Alternatively, some or all of the functions implemented using control processor 220 and memory 228 can be implemented on a general purpose computer, such as a CPU 106a and memory 108a.

The polling approach according to this invention is not limited to wireless situations such as those operating according to the IEEE 802.11 standard. For example, the polling approach is also useful for shared access wired networks, such as Ethernet LANs operating according to the IEEE 802.3 standard. Alternative shared access wired networks include wired networks that use active telephone wiring or other twisted pair conductors, electrical power wiring, or coaxial cables as a transmission-medium. Another wireless application of the polling approach is for media control in a wireless local loop (WLL) telephone system. In another embodiment, the polling approach can be used within a switching device to control data transfers over shared communication paths of a switching fabric that is internal to the switching device.

Other embodiments may also include media control (that is, a polling manager and resource manager) for multiple communication channels. For example, an arbiter station may concurrently control concurrent spread spectrum transmissions which use different hopping patterns of code sequences.

The polling approach described above can also be used to control a heterogeneous LAN in which multiple LANs are coupled at access points. Examples of heterogeneous LANs include a combination of a wireless LAN operating according to the 802.11 standard coupled to a wired LAN operating according to the 802.3 standard, or a combination of wireless LANs operating at different frequencies, different spread spectrum spreading codes, or different modulation approaches.

Other embodiments using wireless data links can use both higher and lower radio frequency ranges, as well as optical frequencies such as in the infra-red range, and may be applicable to other shared access channels that may share a communication medium other than air such as a conductor not dedicated for network communication. Also, frequency hopping spread spectrum may be used instead of direct sequence spread spectrum.

In another alternative embodiment, the polling manager at the arbiter station sends multiple permission to send (PTS) messages at a time rather than always sending a single PTS at a time. For example, the arbiter station can transmit several PTS messages to several sessions or one poll that contains several PTS messages for more than one upcoming transmission.

Other embodiments are within the scope of the following claims.

What is claimed is:

1. A method for media access control in a communication system which includes a plurality of communication stations which communicate over a shared communication medium comprising:
   assigning communication resources in accordance with quality of service requirements of a plurality of communication sessions, including determining a polling pattern;
   polling each of the communication stations to transmit data over the shared communication medium for the plurality of communication sessions according to a polling pattern;
   monitoring data transmitted by the communication stations in response to the polling;
   adapting assignment of the communication resources in accordance with the monitoring, including adapting the polling pattern including for each of the communication sessions adapting a rate of polling associated with said session according to said monitoring and said quality of service requirements by
   reducing a rate of polling for a session in response to the monitored transmissions for that session corresponding to a reduction in actual rate of transmission for that session; and
   increasing a rate of polling for a session in response to the monitored transmissions for that session corresponding to an increase in actual rate of transmission for that session; and
   continuing polling of each of the communication stations according to the adapted polling pattern.

2. The method of claim 1 further comprising:
   accepting a request to establish a new communication session;
   admitting the new session if a quality of service requirement for said new session can be provided without exceeding a limit on available communication capacity on the shared communication medium; and
   rejecting the new session if the quality of service requirement cannot be provided without exceeding the limit on available communication resources.

3. The method of claim 1 wherein assigning communication resources in accordance with the quality of service requirements includes assigning said communication resources according to data rate requirements for the plurality of communication sessions.

4. The method of claim 3 wherein assigning communication resources includes:
   determining a subset of the plurality of communication sessions that can be provided with data rate requirements for said session; and
   assigning data rates to each of the subset of sessions in accordance with said data rate requirements.

5. The method of claim 4 wherein
   monitoring data transmission includes collecting data retransmission statistics, and
   assigning communication resources includes adjusting data rate requirements in accordance with the collected retransmission statistics.

6. Then method of claim 3 wherein assigning communication resources includes optimizing a utility function subject to a set of constraints.

7. The method of claim 1 wherein assigning communication resources in accordance with the quality of service requirements includes assigning said communication resources according to maximum intervals between polling of the plurality of sessions.

8. The method of claim 1 wherein the polling pattern includes a periodic cycle such that during each period of the cycle a subset of the communication sessions are polled in accordance with their allocated communication resources.

9. The method of claim 1 wherein polling the communication stations to transmit data for the plurality of communication sessions includes:
   assembling a data message identifying at least one of the communication sessions; and
   transmitting the data message to one of the communication stations using a wireless transmitter;
   and wherein monitoring data transmitted by the communication stations includes receiving the data transmissions using a wireless receiver.

10. The method of claim 9 wherein assigning the communication resources is performed at a designated arbiter station, and wherein transmitting the data message includes transmitting the data message from the arbiter station to one or more of the communication stations.

11. The method of claim 10 wherein assigning the communication resources is in addition performed at one or more of the communication stations, and wherein the method further comprises designating one of said one or more communication stations to assume the role of the arbiter station.

12. The method of claim 1 further comprising receiving statistics related to the communication session and adapting assignment of the communication resources further includes allocating the resources in accordance with the received statistics.

13. The method of claim 12 wherein the statistics related to the session includes a queue length for a session, and wherein adapting assignment of the communication resources includes adapting the polling sequence according to the queue length.

14. The method of claim 1 wherein assigning communication resources in accordance with the quality of service requirements includes assigning said communication resources according to maximum delay requirements of the plurality of communication sessions.

15. The method of claim 1 wherein assigning communication resources in accordance with the quality of service requirements includes assigning said communication resources according to security requirements of the plurality of communication sessions.

16. The method of claim 1 wherein polling the communication stations to transmit data includes:
assembling a data message identifying a two or more communication sessions originating at two or more of the communication stations and identifying time intervals during which said communication stations are permitted to transmit data over the shared communication medium; and
transmitting the data message to said two or more communication stations.

17. The method of claim 1 wherein assigning communication resources includes assigning communication resources for each of a plurality of communication channels one the shared communication medium.

18. The method of claim 17 wherein assigning communication resources for each of the plurality of communication channels includes determining a separate polling pattern for each of said channels.

19. The method of claim 1 wherein the communication system includes a distributed telecommunication system.

20. The method of claim 19 wherein the distributed telecommunication system is a wireless local loop system.

21. An apparatus for controlling media access by a plurality of stations configured to communicate over a shared communication medium in a communication system comprising:
means for assigning communication resources in accordance with quality of service requirements of a plurality of communication sessions, including a means for determining a polling pattern;
means for polling each of the communication stations to transmit data over the shared communication medium for the plurality of communication sessions according to the polling pattern;
means for monitoring data transmitted by the communication stations in response to the polling; and
means for adapting assignment of the communication resources in accordance with the monitoring, including adapting the polling pattern including for each of the communication sessions adapting a rate of polling associated with said session according to said monitoring and said quality of service requirements by
reducing a rate of polling for a session in response to the monitored transmissions for that session corresponding to a reduction in actual rate of transmission for that session; and
increasing a rate of polling for a session in response to the monitored transmissions for that session corresponding to an increase in actual rate of transmission for that session.

22. The apparatus of claim 21 further comprising:
means for accepting a request to establish a new communication session over the shared communication medium;
means for admitting the new communication session if a quality of service requirement for said session can be provided without exceeding a limit on available communication resources; and
means for rejecting the new session if the quality of service requirement cannot be provided without exceeding the limit on available communication resources.

23. A computer readable medium encoded with software for causing a computer to perform the functions of:
assigning communication resources in accordance with quality of service requirements of a plurality of communication sessions on a shared communication medium, including determining a polling pattern;
polling each of plurality of communication stations to transmit data for the plurality og communication sessions according to a polling pattern;
monitoring data transmitted over the shared communication medium by the communication stations in response to the polling;
adapting assignment of the communication resources in accordance with the monitoring, including adapting the polling pattern including for each of the communication sessions adapting a rate of polling associated with said session according to said monitoring and said quality of service requirements by
reducing a rate of polling for a session in response to the monitored transmissions for that session corresponding to a reduction in actual rate of transmission for that session; and
increasing a rate of polling for a session in response to the monitored transmissions for that session corresponding to an increase in actual rate of transmission for that session; and
continuing polling of each of the communication stations according to the adapted polling pattern.

24. The computer readable medium of claim 23, wherein the software further causing the computer to perform the functions of:
accepting a request to establish a new communication session;
admitting the new communication session if a quality of service requirement for said session can be provided without exceeding a limit on available communication resources; and
rejecting the new session if the quality of service requirement cannot be provided without exceeding the limit on available communication resources.

25. The computer readable medium of claim 24 wherein the quality of service requirement for the new communication session includes a minimum required and a maximum desired data rate.

26. An apparatus for polling a plurality of stations configured to communicate over a shared communication medium in a communication system comprising:
a polling manager configured to send polling messages to the stations in accordance with a polling pattern;
a transmitter coupled to the polling manager configured to accept the polling messages from the polling manager and to transmit the messages over the shared communication medium to the stations; and
a receiver coupled to the polling manager configured to receive messages over the shared communication medium from the stations and to provide monitoring information to the polling manager;

wherein the polling manager is configured to adapt the polling pattern including adapting a rate of polling associated with each of the stations in accordance with the monitoring information and the quality of service requirements of communication sessions at the stations by reducing a rate of polling for a session in response to the monitored transmissions for that session corresponding to a reduction in actual rate of transmission for that session, and increasing a rate of polling for a session in response to the monitored transmissions for that session corresponding to an increase in actual rate of transmission for that session.

27. The apparatus of claim 26 further comprising a resource manager coupled to the polling manager configured to accept requests to admit communication sessions and to provide resource allocations for admitted sessions to the polling manager.

28. In a communication system in which a plurality of stations share access to a communication network according to a multiple-access media access control protocol, a method for controlling access by the stations to said network comprising:

at an arbiter station that is coupled to the communication network, determining a polling pattern for polling the plurality of stations including reducing a rate of polling for a station in response to monitored transmissions for that session corresponding to a reduction in actual rate of transmission for that station, and increasing a rate of polling for a station in response to the monitored transmissions for that session corresponding to an increase in actual rate of transmission for that station, wherein the rate of polling for a station satisfies quality of service requirements for a plurality of communication sessions at the station;

transmitting polling messages from the arbiter station to each of the plurality of communication stations according to the polling pattern;

receiving the polling messages at the plurality of stations; and at each of the plurality of stations, using the received polling messages to determine times when to transmit onto the communication network, and at said determined times transmitting data onto the communication network using the multiple access media access control protocol.

29. The method of claim 28 further comprising, at each of the plurality of stations, providing a software interface to a network layer protocol module, and accepting messages over said software interface from the network layer protocol module, and wherein determining the times when to transmit onto the communication network includes determining times when to transmit said messages accepted over said software interface.

30. The method of claim 29 wherein transmitting data onto the communication network includes transmitting the accepted messages using an Ethernet protocol.

31. The method of claim 30 wherein the network layer protocol module includes an Internet Protocol (IP) module.

* * * * *

UNITED STATES PATENT AND TRADEMARK OFFICE
CERTIFICATE OF CORRECTION

PATENT NO. : 7,460,514 B2 Page 1 of 1
APPLICATION NO. : 11/492735
DATED : December 2, 2008
INVENTOR(S) : Aura Ganz It is certified that error appears in the above-identified patent and that said Letters Patent is hereby corrected as shown below:

Title Page;
On page 1, column 1, Inventors, delete "Hwham" and insert --Hwhan--, therefor.

On page 1, column 2, Other Publications, delete the word "Networks" and insert --Network--, therefor.

In column 16, line 31, Claim 6, delete "Then" and insert --The--, therefor.

In column 17, line 29, Claim 17, delete "one the" and insert --one of the--, therefor.

In column 18, line 19, Claim 25, delete "og" and insert --of--, therefor.

Signed and Sealed this

Twenty-fourth Day of February, 2009

JOHN DOLL
*Acting Director of the United States Patent and Trademark Office*